Oct. 1, 1940.   H. J. H. RUGE   2,216,421
WEIGHING MACHINE
Filed Sept. 23, 1936   2 Sheets-Sheet 1
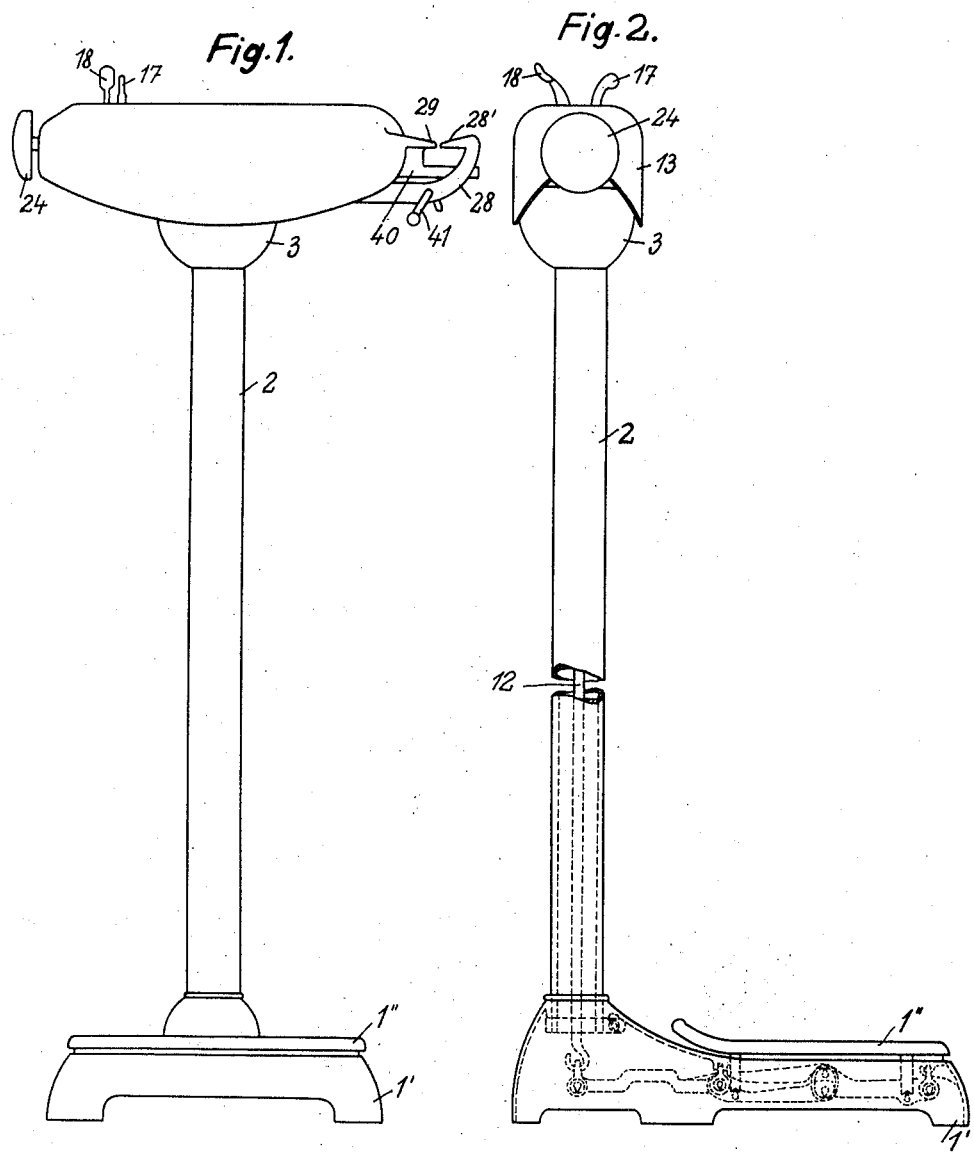
Inventor
H. J. H. Ruge
by
C. F. Wenderoth
Attorney Oct. 1, 1940.   H. J. H. RUGE   2,216,421
WEIGHING MACHINE
Filed Sept. 23, 1936   2 Sheets-Sheet 2
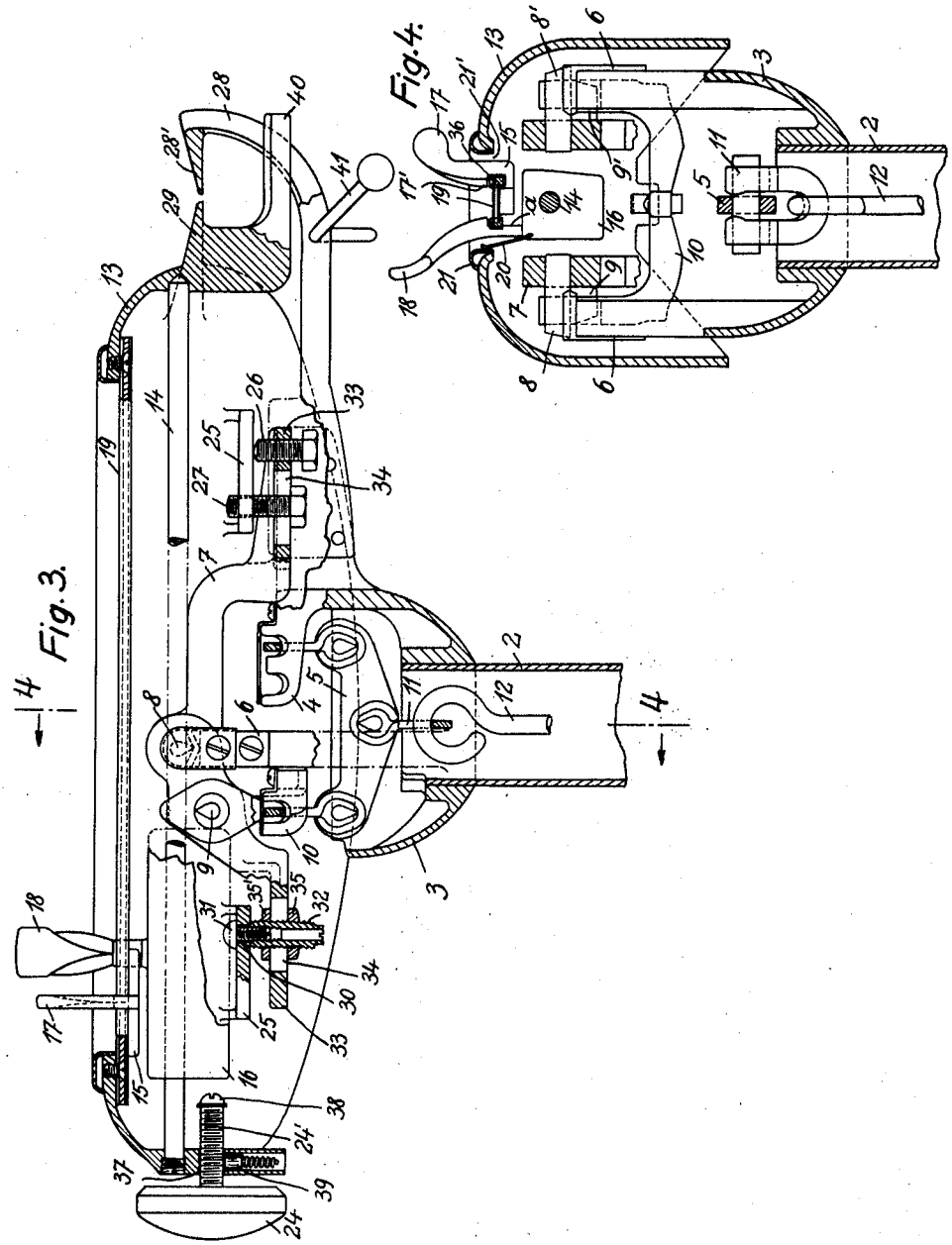
Inventor
H. J. H. Ruge
by
E. F. Wenderoth
Attorney Patented Oct. 1, 1940

2,216,421

UNITED STATES PATENT OFFICE 2,216,421

WEIGHING MACHINE

Heinrich Johannis Hermann Ruge, Hamburg, Germany, assignor to the firm Vogel & Halke, Hamburg, Germany Application September 23, 1936, Serial No. 102,203
In Germany September 26, 1935

6 Claims. (Cl. 265—49)

This invention relates to a weighing machine in which equilibrium is brought about by the adjustment of a sliding weight on a beam. In weighing machines of this kind which have hitherto been proposed, the sliding weights have been mounted on the beam so as to be completely free in order to make satisfactory operation possible. The beam, on which the sliding weights are displaceable, have usually had a rectangular section. This form of beam has the disadvantage that, for example, in the construction of personal weighing machines, it is very difficult to produce a satisfactory enclosed form for the whole machine, for the closure at the top is formed by the beam which is made of various sections which are resistant to bending. It is also comparatively costly to improve the whole balance, including the weights, by a metallic coating of chromium, nickel or the like. The construction which has hitherto been usual is also accompanied by a considerable height of the machine, because the beam carrying the sliding weight has to be at about eye-level. However, particularly in the case of lightly-built personal weighing machines, this results in top-heaviness of the machine which can easily lead to tipping-over.

The present invention on the other hand is concerned with a sliding-weight weighing machine which is characterized by the fact that the beam is made in the form of a casing which wholly or partly covers the transmission members. In the preferred form of weighing machine according to the invention, the beam is releasably connected with a casing covering the transmission members. The beam casing is expediently arranged to be symmetrical with respect to the axis of the weighing machine. According to one feature of the invention, the beam casing is connected with the beam by means of screws which are displaceable in elongated holes in the beam in the direction of its longitudinal axis. The spindle support or the beam is conveniently displaceably connected with the beam casing in the vertical and horizontal directions by means of tension and pressure screws. According to a further feature of the invention, instead of separate tension screws and pressure screws, a screw in the form of a nut is employed, the nut being in the form of a sleeve provided externally with a screw-thread for screwing into the end of the balance beam and internally with a thread for the reception of a screw provided with a head for securing the spindle support to the beam casing. All the transmission members are preferably enclosed by the pillar and the beam casing. The sliding weights, which are guided in the well-known manner on rails or on the section of the beam, the rail carrying the scale or on a flange or the like arranged on any of these parts, are accommodated in the interior of the beam casing and provided with handles which project uniformly from the section of the beam. The sliding weights or their handles, in one form of weighing machine according to the invention, are provided with knife-edges or the like and are so mounted that while axially displaceable on the slide rail or the scale rail, the knife-edge or the like is brought by gravity or spring-action into engagement in its position of rest with stops which are conveniently arranged on the surface of the beam casing on a rail provided with a scale. The handles are preferably provided with a pointer or other indicating device above the scale. The scale may be fitted to the front of the beam casing.

In the accompanying drawings one form of personal weighing machine according to the invention is illustrated by way of example. In these drawings:

Fig. 1 is a front elevation and Fig. 2 a side elevation, while

Fig. 3 illustrates on a larger scale the balance beam of the weighing machine of Figs. 1 and 2 in front view and partly in section.

Fig. 4 is a section on the line 4—4 of Fig. 3.

The weighing machine illustrated in the drawings consists of a lower stand 1' which is made in the form of a frame and is provided with a platform 1''. The lower stand 1' may have any desired form and is preferably made as one integral block. The bearings, suspension devices, and so on for supporting and transmitting the load on the platform 1'' to the balance beam are arranged within the lower frame 1', 1'' in the well-known manner and are indicated in dotted lines in Fig. 2. A pillar 2 is arranged on the lower stand 1' and in it is accommodated, in such a way as to be displaceable axially, a tension rod 12 for transmitting the load to the balance beam. The upper part of the pillar 2 merges into a head 3 which, for example, and as shown, takes the form of a hemispherical casing. A hook 4 is arranged inside the head 3 for the suspension of a sub-beam 5. Two beam bearings 6 are screwed directly to the head 3. The two main spindles 8, 8' of a spindle support 7 rest on the bearing surfaces of the two beam bearings 6. Two other spindles 9, 9' on the spindle support 7 support a beam suspension device 10. The sub-beam 5, which is hung on the hook 4, transmits the load, which acts on it by way of the tension rod 12, to the beam suspension device 10 by means of an intermediate suspension device 11.

These transmitting members 5—10 are, according to the invention, covered by a beam casing 13 which has inside it flange-like projections or lugs 25 having bores 30 by means of which the beam casing 13 can be secured firmly to flanges 33 on the spindle support 7. In each flange 33 there is an elongated longitudinal hole 34 by means of which the beam casing is secured. This may be done by means of a tension-screw 27 and a pressure-screw 26 or, as shown at the right of Fig. 3, by means of a special device shown at the left of Fig. 3. This last-mentioned device consists of an internally- and externally-threaded sleeve-like member 32, which is secured in the elongated hole 34 at the desired height by means of the external thread and two lock-nuts 35, 35'. The lug 25 of the balance beam 13 is secured to the member 32 by screwing a screw 31 into the internal thread of the member. The distance between the spindle support 7 or the lug 33 and the lug 25 of the balance beam 13 may then be easily adjusted accordingly and the balance beam 13 also adjusted in the longitudinal direction by moving the member 32 along the elongated hole 34 after releasing the nut 35.

The beam cover 13 is provided with a slide rail or a spindle 14 on which the sliding weight 16 can be displaced in the longitudinal direction. The sliding weight 16 is provided with a handle 18 which projects out of the top of the beam cover 13 and is made in the form of a knife-edge at a. The weight 16 is conveniently so formed that the position of its centre of gravity is such that the knife-edge a rests as the result of gravity in recesses or notches in the beam rail 19 which are, of course, arranged to correspond to definite weights. The handle 18 may, however, be provided with a spring 20 for pressing the knife-edge a into the recesses or notches.

A smaller sliding weight 15 is provided with a handle 17 which is likewise constructed in the form of a pointer. The small weight 15 may also be displaceable in the longitudinal direction of the beam rail on a spindle or, as is illustrated in Fig. 4, on a flange 36 or the section of the beam rail 19. It is convenient to adjust the weight by kilograms with the main weight 16 and fractions, e. g. 0.1 kilogram, by the additional weight 15. Of course other divisions or arrangements can be adopted without departing from the scope of the invention. The handles 17 and 18 may be formed as pointers adjacent to the knife-edge a in order to permit easier reading of the marks indicating the stages of weight which are provided on a scale on the rail 19.

In order to be able to adjust the balance beam 13, a sideways displacement of the beam cover 13 in the longitudinal slots 34 of the lug 33 of the spindle support is made possible, as already mentioned. This construction makes it possible further to adjust the sensitivity of the beam at zero and full load. In order to make fine adjustment possible, there is provided a weight 24 having a screw-threaded spindle 24' which screws into one end 37 of the beam casing so that by rotating the weight 24 it may be moved towards or away from the beam casing 13. In order to prevent the weight 24 from falling out, the inner end of the spindle 24' is provided with a stop such as a screw 38. The spindle 24' is maintained in its adjusted position by the friction of a surface 39 which is resiliently urged against it.

The head 3 is provided at its one end with a front strut 28 which carries a pointer 28' arranged to come opposite a pointer 29 on the end wall of the beam casing 13 opposite to the fine adjusting weight 24. Near this pointer 29 there may also be provided a projection or stop 40, which by means of an angle lever 41 can be lifted into the position of rest in order to hold fast the beam cover. In order to make it easy to read off the positions of the weights after they have been adjusted, the upper face of the beam cover 13 or the rail 19 with its scale, or both, may be inclined towards the side from which the weights are to be read. The upper opening 21' of the beam casing 13, through which the levers 17 and 18 of the weights 15 and 16 project, may be provided by an edge rail or a frame 21 against which the spring 20 of the sliding weight 16 presses.

The construction of the sliding weight beam as a beam casing 13 according to the invention is not in any way restricted to its employment for personal weighing machines but may be employed with advantage in sliding weight weighing machines of all kinds. Not only the reduction of the height but also the manner of balancing and of the adjustment during weighing as well as reading may be applied with advantage to all kinds of sliding weight scales.

It is to be understood that the claims are not limited to the constructions shown in the drawings since clearly modifications may be made and, therefore, the claims are intended to be construed to cover all such modifications as their language will allow in the light of the prior art.

I claim:

1. A weighing machine comprising a casing serving as a balance beam, a spindle support having elongated longitudinal holes therein, screw means extending through said holes for securing said casing longitudinally adjustably to said spindle support, a slidable weight supported by said casing, supporting means for supporting a body to be weighed and members transmitting the load from said supporting means to said spindle support.

2. A weighing machine comprising a casing serving as a balance beam, a spindle support, tension and pressure screws securing said casing to said spindle support so as to be adjustable with respect thereto horizontally and vertically, a weight slidably mounted on said casing, supporting means for supporting a body to be weighed and members transmitting the load from said supporting means to said spindle support.

3. A weighing machine comprising a casing serving as a balance beam, a spindle support, a weight slidably supported by said casing, supporting means for supporting a body to be weighed, members transmitting the load from said supporting means to said spindle support, a sleeve having interior and exterior threads, means securing said sleeve by one of said threads to said casing and means securing said sleeve by the other of said threads to said spindle support.

4. A weighing machine comprising a casing serving as a balance beam, a spindle support, a weight slidably supported by said casing, supporting means for supporting a body to be weighed, members transmitting the load from said supporting means to said spindle support, a sleeve having interior and exterior threads, a screw connecting said casing to said sleeve and nuts for securing said spindle support to said sleeve.

5. A weighing machine comprising a casing serving as a balance beam, a weight slidably mounted on and enclosed in said casing, a handle secured to said weight and projecting from said casing, a rail having scale indicia thereon mounted on said casing, means on said rail for holding said weight in a plurality of positions, supporting means for supporting a body to be weighed, members transmitting the load from said supporting means to said casing and said casing enclosing some of said transmitting members.

6. A weighing machine comprising a casing serving as a balance beam, a weight slidably mounted on said casing, flanges on said casing, a spindle support adjustably secured to said flanges, supporting means for supporting a body to be weighed and members transmitting the load from said supporting means to said spindle support and thereby to said casing.

HEINRICH JOHANNIS HERMANN RUGE.